(12) United States Patent
Morimoto

(10) Patent No.: US 8,110,792 B2
(45) Date of Patent: Feb. 7, 2012

(54) ABSOLUTE POSITION LENGTH MEASUREMENT TYPE ENCODER

(75) Inventor: Kouji Morimoto, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 86 days.

(21) Appl. No.: 12/464,358

(22) Filed: May 12, 2009

(65) Prior Publication Data

US 2009/0283667 A1 Nov. 19, 2009

(30) Foreign Application Priority Data

May 13, 2008 (JP) .................................. 2008-125631

(51) Int. Cl.
*G01D 5/36* (2006.01)
(52) U.S. Cl. .............................. 250/231.14; 250/231.18
(58) Field of Classification Search ........... 250/231.13–231.18, 237 G; 341/11, 341/13, 31; 356/614, 616–619; 359/436–442; 33/1 PT, 1 N
See application file for complete search history.

(56) References Cited

U.S. PATENT DOCUMENTS

| | | | | |
|---|---|---|---|---|
| 5,068,529 A | * | 11/1991 | Ohno et al. | 250/231.18 |
| 5,825,307 A | * | 10/1998 | Titus et al. | 341/13 |
| 6,271,661 B2 | | 8/2001 | Andermo et al. | 324/207.17 |
| 7,022,975 B2 | * | 4/2006 | Horton | 250/231.14 |
| 7,199,355 B2 | * | 4/2007 | Lippuner | 250/231.13 |
| 7,446,306 B2 | * | 11/2008 | Yaku et al. | 250/231.13 |
| 7,663,093 B2 | * | 2/2010 | Kusano | 250/231.18 |
| 2001/0003422 A1 | * | 6/2001 | Andermo et al. | 324/207.17 |
| 2002/0105656 A1 | | 8/2002 | Nahum et al. | |
| 2004/0015323 A1 | * | 1/2004 | Boyton | 702/150 |
| 2004/0046112 A1 | * | 3/2004 | Durocher | 250/231.13 |
| 2006/0049342 A1 | * | 3/2006 | Lippuner | 250/231.13 |
| 2007/0187583 A1 | * | 8/2007 | Yaku et al. | 250/231.13 |
| 2008/0252906 A1 | * | 10/2008 | Kusano | 356/615 |
| 2008/0315076 A1 | * | 12/2008 | Kusano | 250/231.1 |
| 2009/0256065 A1 | * | 10/2009 | Kusano et al. | 250/231.1 |
| 2009/0272886 A1 | * | 11/2009 | Kusano et al. | 250/231.1 |
| 2009/0283667 A1 | * | 11/2009 | Morimoto | 250/231.13 |
| 2009/0294637 A1 | * | 12/2009 | Kusano et al. | 250/231.13 |
| 2010/0140463 A1 | * | 6/2010 | Villaret | 250/231.14 |

FOREIGN PATENT DOCUMENTS

| | | |
|---|---|---|
| EP | 1 398 244 | 3/2004 |
| WO | 02/01160 | 1/2002 |

* cited by examiner

*Primary Examiner* — John Lee
(74) *Attorney, Agent, or Firm* — Rankin, Hill & Clark LLP

(57) ABSTRACT

An absolute position length measurement type encoder includes: a scale in which an ABS pattern based on a pseudorandom code is provided; a light-receiving element for receiving bright and dark patterns formed by the scale; and a signal processing circuit for processing signals subjected to output of the light-receiving element and measuring an absolute position of the scale to the light-receiving element, wherein the signal processing circuit includes a space-dividing number conversion circuit that obtains finer intervals D than the array interval $P_{PDA}$ of the ABS light-receiving element array of the light-receiving element, and simultaneously obtains and outputs a digital value for each of the intervals D subjected to output of the ABS light-receiving element array. Therefore, even where the minimum line width of the ABS pattern is not an integral multiple of the array interval of the ABS light-receiving element array, an arithmetic operation for the correlation can be carried out, and the moving distance can be measured at high accuracy.

5 Claims, 6 Drawing Sheets

ABSOLUTE POSITION LENGTH MEASUREMENT TYPE ENCODER

CROSS-REFERENCE TO RELATED APPLICATION

The disclosure of Japanese Patent Application No. 2008-125631 filed on May 13, 2008 including specifications, drawings and claims is incorporated herein by reference in its entirety.

BACKGROUND OF THE INVENTION

1. Field of the Invention

The present invention relates to an absolute position length measurement type encoder that includes a scale in which an ABS pattern based on a pseudorandom code is provided, a light-receiving element for receiving bright and dark patterns formed by the scale, and a signal processing circuit for processing signals in compliance with output of the light-receiving element and measuring an absolute position of the scale with respect to the light-receiving element, and in particular to an absolute position length measurement type encoder capable of measuring a moving distance at high accuracy by arithmetic operations for correlation without being influenced by an array interval of ABS light-receiving element array of the light-receiving element.

2. Description of the Related Art

Accurate position control and measurement are indispensable in measuring instruments and apparatuses. Therefore, an absolute position length measurement type encoder capable of executing absolute position measurement over some length has been used. In particular, where high accuracy is required, a photoelectric type encoder has been used.

Generally, an absolute position length measurement type photoelectric encoder has an absolute pattern (hereinafter called an ABS pattern) to roughly measure a moving distance and an incremental pattern (hereinafter called an INC pattern) to measure a moving distance at high resolution power by interpolating the interval of a roughly obtained moving distance on a scale. The light-receiving element includes ABS light-receiving element array for ABS pattern and INC light-receiving element array for INC pattern.

Since bright and dark patterns formed by ABS pattern and INC pattern, which are formed on the scale, change on the light-receiving element, which receives the bright and dark patterns, the moving distance can be measured at high accuracy by processing the change in a signal processing circuit. The ABS pattern is prepared based on a pseudorandom code, and patterns to be used can be made into one, wherein the absolute position length measurement type encoder itself can be downsized. Also, since highly accurate measurement is enabled for a moving distance in measurement of the absolute position, a method for arithmetic operation for correlation has been used (For example, Japanese Published Unexamined Patent Application No. 2002-230560 (hereinafter called Patent Document 1), and Japanese Published Unexamined Patent Application No. 2006-226987 (hereinafter called Patent Document 2)).

However, digital signals used for arithmetic operations for correlation are discrete data obtained per array interval of the ABS light-receiving element array. Therefore, when carrying out an arithmetic operation for correlation using the discrete data, it was assumed that an integral multiple of the array interval of the ABS light-receiving element array is equal to the minimum line width of the ABS pattern based on the pseudorandom code being an object of the arithmetic operation for correlation (Patent Documents 1 and 2). However, there is a restriction in the array interval of the ABS light-receiving element array, freedom for selection of the light-receiving elements was necessarily reduced. Also, the degree of freedom in design for the minimum line width of the ABS pattern could not be sufficiently secured. As a result, there is a problem in that adverse influences are given to the size and performance of the absolute position length measurement type encoder and to the production cost thereof.

SUMMARY OF THE INVENTION

The present invention was developed to solve the above-described problems of the prior arts, and it is therefore an object to provide an absolute position length measurement type encoder capable of carrying out arithmetic operations for correlation even where the minimum line width of ABS pattern is not an integral multiple of the array interval of ABS light-receiving element array and measuring a moving distance at high accuracy.

A first aspect of the present invention is an absolute position length measurement type encoder including:

a scale in which an ABS pattern based on a pseudorandom code is provided;

a light-receiving element for receiving bright and dark patterns formed by the scale; and a signal processing circuit for processing signals subjected to output of the light-receiving element and measuring an absolute position of the scale to the light-receiving element;

wherein the signal processing circuit includes a space-dividing number conversion circuit that obtains finer intervals D than the array interval $P_{PDA}$ of the ABS light-receiving element array of the light-receiving element, and simultaneously obtains and outputs a digital value for each of the intervals D subjected to output of the ABS light-receiving element array.

A second aspect of the present invention is featured in that the array interval $P_{PDA}$ of the ABS light-receiving element array is made into one-third or less the minimum line width $P_{ABS}$ of the ABS pattern.

A third aspect of the present invention is featured in that the signal processing circuit further includes a correlation circuit for executing arithmetic operations for correlation between a digital value subjected to output of the space-dividing number conversion circuit and a design value of the pseudorandom code.

A fourth aspect of the present invention is featured in that the interval D is made into the maximum real number value, which satisfies expressions (1) and (2) with respect to the array interval $P_{PDA}$ and the minimum line width $P_{ABS}$ of the ABS pattern.

$$P_{PDA}=D*k1 \text{ (where } k1 \text{ is an integral number greater than 1)} \quad (1)$$

$$P_{ABS}=D*k2 \text{ (where } k2 \text{ is an integral number)} \quad (2)$$

A fifth aspect of the present invention is featured in that the digital values for each of the intervals D are obtained by linearly interpolating two digital values adjacent to each other in digital values subjected to output of the ABS light-receiving element array.

A sixth aspect of the present invention is featured in that the scale is provided with an INC pattern.

A seventh aspect of the present invention is featured in further including:

a light-receiving element for receiving bright and dark patterns formed by the INC pattern;

an incremental position detection circuit for detecting an incremental position by processing signals output from the light-receiving element; and an absolute position outputting circuit for selecting which one of a signal output from the incremental position detection circuit and an ABS position signal output from a correlation circuit in the signal processing circuit is to be output as a position data signal.

An eighth aspect of the present invention is featured in that the absolute position outputting circuit normally selects the signal output from the incremental position detection circuit, references the same signal to the ABS position signal once every predetermined time interval, outputs the ABS position signal as the position data signal if there is a difference between the positions obtained from the two signals, feeds the position data signal back to the incremental position detection circuit, and simultaneously sets the same position data signal in the inside of the incremental position detection circuit as the current value.

A ninth aspect of the present invention is featured in that the feedback is carried out when the data are not renewed at a data refreshing rate in the correlation circuit.

Also, a tenth aspect of the present invention is featured in that the digital value subjected to arithmetic operations for correlation by the correlation circuit is made into a value binarized by the unit of the minimum line width $P_{ABS}$ of the ABS pattern.

An eleventh aspect of the present invention is featured in that the signal processing circuit includes; in the front stage of the correlation circuit, an edge position detection circuit for first binarizing a signal output from the space-dividing number conversion circuit;

a peak position detection circuit for preparing a histogram with respect to a position where a value obtained from a signal differentiated and made into an absolute value after being binarized becomes a local maximum value, for each of the minimum line width $P_{ABS}$ of the ABS pattern and for obtaining a peak position PK from the histogram; and a decoding circuit for processing the peak position PK based on the binarized value of a signal as the position where the pseudorandom code to be decoded is changed over; and includes: in the back stage of the correlation circuit, a position data synthesizing circuit for obtaining an accurate absolute position, with respect to the before-ABS-correction position signal output from the correlation circuit, through position correction by shifting the absolute position only by the peak position PK by means of a peak position signal obtained by the peak position detection circuit.

A twelfth aspect of the present invention is featured in that the peak position detection circuit obtains the peak position PK by interpolating respective values of the histogram by fitting a probability distribution function by the least-squares method.

A thirteenth aspect of the present invention is featured in that the decoding circuit obtains respective total sums of the binarized values in the minimum line width $P_{ABS}$, determines and decodes the code of the minimum line width $P_{ABS}$ with a value having a greater total sum.

A fourteenth aspect of the present invention is featured in that the correlation circuit carries out arithmetic operations for correlation between the decoded pseudorandom code and the design value of the pseudorandom code, and obtains the absolute position of the scale with respect to the light-receiving element.

A fifteenth aspect of the present invention is featured in that the position data synthesizing circuit synthesizes position data by adding the peak position PK of the peak position signal to the absolute position of the absolute position signal.

According to the present invention, where the minimum line width $P_{ABS}$ of the ABS pattern is not an integral multiple of the array interval $P_{PDA}$ of the ABS light-receiving element array, a finer interval than the array interval $P_{PDA}$ may be made into a minimum resolution power, wherein the moving distance can be measured without lowering the accuracy. Therefore, the degree of freedom in design of the minimum line width of the ABS pattern and range of selection of the light-receiving element can be widened, wherein it becomes possible to compose an absolute position length measurement type encoder having a greater degree of freedom with respect to the size, performance and cost thereof.

Also, an absolute position length measurement type encoder can be composed, which, where an arithmetic operation for correlation is carried out, is robust and capable of correctly measuring the moving distance even if there is an error in output of the ABS light-receiving element array.

In particular, where the interval D is the maximum real number value that satisfies the expressions (1) and (2), it becomes possible to quickly measure the moving distance at a further higher accuracy without increasing the arithmetic operation amount more than necessary.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Hereinafter, a detailed description is given of embodiments of the present invention with reference to the drawings.

Figure 1:
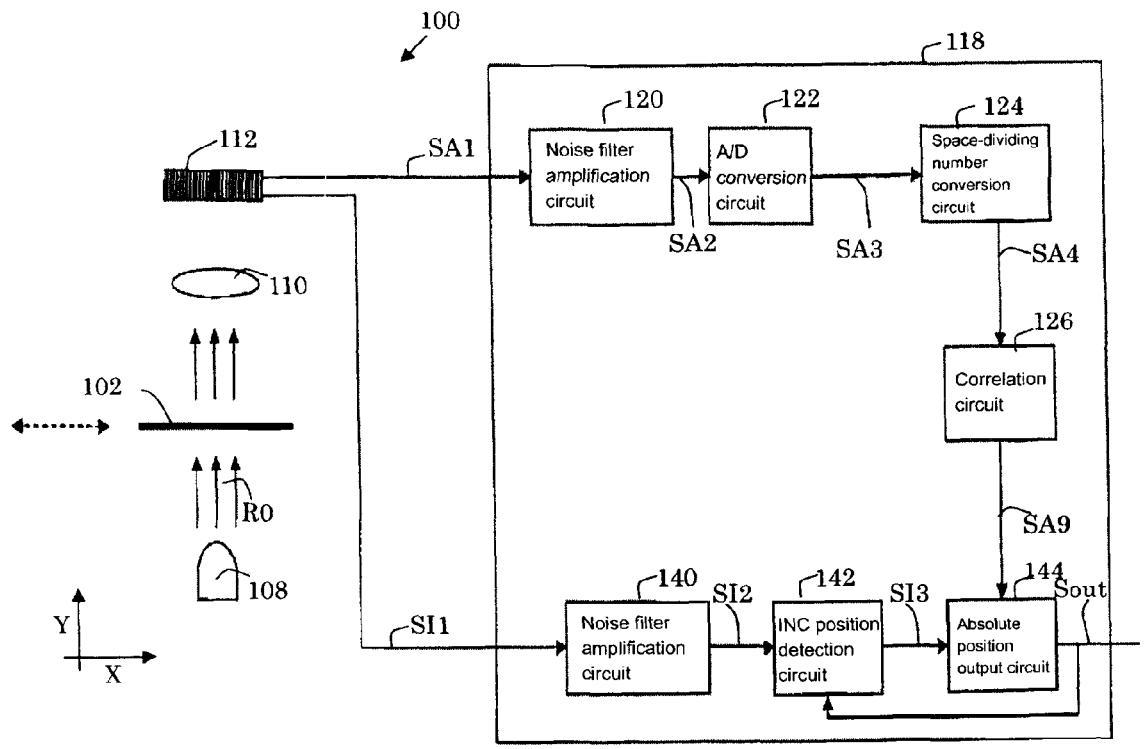
FIG. 1 is a schematic view showing the entirety of an absolute position length measurement type encoder according to Embodiment 1 of the present invention.
Figure 2:
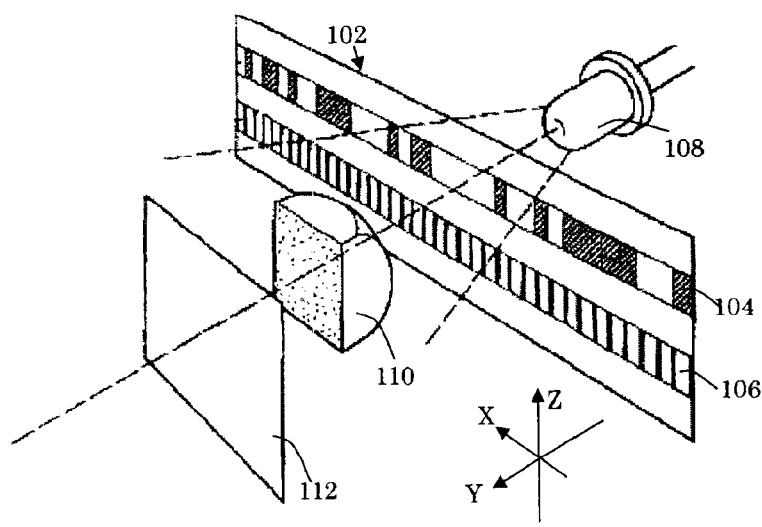
FIG. 2 is a perspective view schematically showing the relationship between a light-emitting element, a scale and a light-receiving element according thereto.
Figure 3:
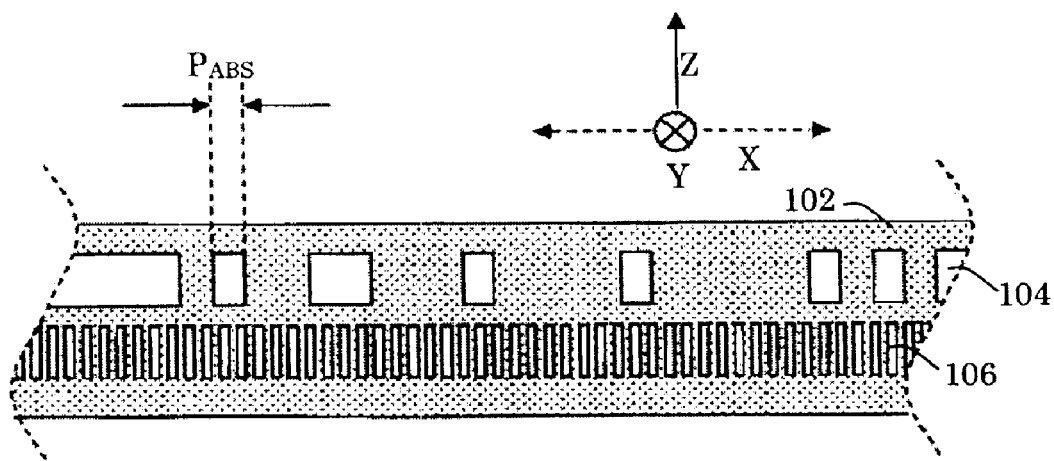
FIG. 3 is a schematic view showing the scale according thereto.
Figure 4:
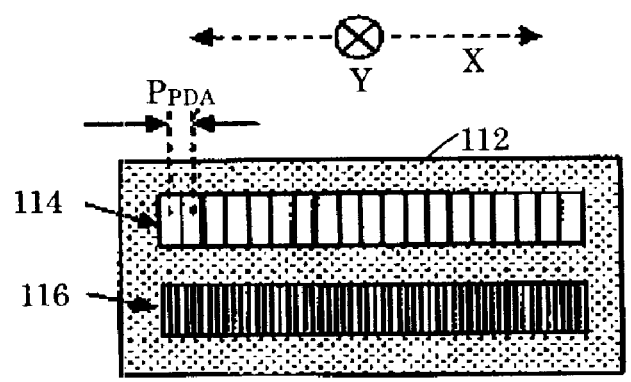
FIG. 4 is a schematic view showing the light-receiving element according thereto.

Embodiment 1 according to the present invention will be described using FIG. 1 through FIG. 4. FIG. 1 is a schematic view showing the entirety of an absolute position length measurement type encoder according to Embodiment 1 of the present invention, FIG. 2 is a perspective view schematically showing the relationship between a light-emitting element, a scale and a light-receiving element, and FIG. 3 is a schematic view showing the scale, FIG. 4 is a schematic view of a light-receiving element.

First, a brief description is given of the entire configuration of the present embodiment.

Mainly as shown in FIG. 1, an absolute position length measurement type encoder 100 includes a scale 102 (Refer to FIGS. 2 and 3) in which an ABS pattern 104 based on a pseudorandom code is provided, a light-receiving element 112 for receiving bright and dark patterns formed by the scale 102 and a signal processing circuit 118 for processing signals subjected to output of the light-receiving element 112 and for measuring the absolute position of the scale 102 with respect to the light-receiving element 112.

Here, the signal processing circuit 118 includes a space-dividing number conversion circuit 124 for obtaining a finer interval D than the array interval $P_{PDA}$ of the ABS light-receiving element array 114 of the light-receiving element 112 and obtaining and outputting a digital value for each of the intervals D in compliance with output of the ABS light-receiving element array 114; and a correlation circuit 126 for carrying out arithmetic operations for correlation between a digital value subjected to output of the space-dividing number conversion circuit 124 and the design value of a pseudorandom code.

A detailed description is given below of respective components.

As shown in FIG. 2 and FIG. 3, the scale 102 includes the ABS pattern 104 and the INC pattern 106. As shown in FIG. 2, as light R0 projected from the light-emitting element 108 is irradiated onto the scale 102 orthogonal to the optical axis direction (Y-axis direction), bright and dark patterns are imaged on the light-receiving element 112 via the lens 110 by means of the ABS pattern 104 and the INC pattern 106. The ABS pattern 104 and the INC pattern 106 can form bright and dark patterns by being brought into a transparent state where the projection light R0 is not interrupted, if the code is 1, and into a non-transparent state where the projection light R0 is interrupted, if the code is 0, for example.

A pseudorandom code is used for the ABS pattern 104. Here, for example, M-sequence code, which becomes the longest cycle, of the code series generated by a shift register may be used as the pseudorandom code. At this time, the line width per one pseudorandom code becomes the minimum line width $P_{ABS}$ of the ABS pattern 104 as shown in FIG. 3. The INC pattern 106 is a pattern consisting of cyclically formed 1 and 0. In the present embodiment, the ABS pattern 104 is disposed upside in the Z-axis direction in FIG. 3 while the INC pattern 106 is disposed downside. For example, an LED may be used as the light-emitting element 108.

The lens 110 may be composed of a single lens (for example, cylindrical lens, etc.) by which two patterns 104 and 106 are simultaneously imaged as shown in FIG. 2. Or, the lens 110 may be composed of two lenses, by which the ABS pattern 104 and the INC pattern 106 are individually imaged. In addition, the lens 110 may not necessarily be used.

As shown in FIG. 4, the light-receiving element 112 includes two light-receiving element arrays 114 and 116, one of which is the ABS light-receiving element array 114, and the other of which is a light-receiving element array 116 for the INC pattern (hereinafter referred to as an INC light-receiving element array). The array arrangement pitch $P_{PDA}$ of the ABS light-receiving element array 114 is as shown in FIG. 4. That is, the spatial resolution power of the ABS light-receiving element array 114 becomes an array arrangement pitch $P_{PDA}$. Here, the array arrangement pitch $P_{PDA}$ is narrower than the minimum line width $P_{ABS}$ of the ABS pattern 104, and may be made into, for example, one-third thereof or less. If the array arrangement pitch $P_{PDA}$ is made still narrower, the number of samplings in the minimum line width $P_{ABS}$ is increased, and further highly accurate measurement of the absolute position can be carried out. The ABS light-receiving element array 114 outputs an ABS bright and dark signal SA1 by sweeping the bright and dark patterns formed by the ABS pattern 104 in the array direction (the X-axis direction).

The INC light-receiving element array 116 has a four-phase output with a phase difference of 90° (not illustrated). The INC light-receiving element array 116 sweeps the bright and dark patterns formed by the INC pattern 106 in the array direction (the X-axis direction), and outputs the INC bright and dark signal SI1. Where the bright and dark patterns formed by the INC pattern 106 are detected by the INC light-receiving element array 116 consisting of four phases with a phase difference of 90°, a four-phase sinusoidal wave signal with a phase difference of 90° is output. In addition, the array arrangement pitch of the INC light-receiving element array 116 is narrower than the array arrangement pitch $P_{PDA}$ of the ABS light-receiving element array 114 in order to interpolate between an obtained absolute position and the absolute position.

As shown in FIG. 1, a noise filter/amplification circuit 120 processes the ABS bright and dark signal SA1 output from the light-receiving element 112. At this time, the noise filter/amplification circuit 120 cuts off high frequency noise by its low-pass filter, carries out amplification at a predetermined gain, and outputs a signal SA2.

As shown in FIG. 1, an A/D conversion circuit 122 converts the signal SA2 output from the noise filter/amplification circuit 120 from analog signals to digital signals, and outputs a signal SA3.

As shown in FIG. 1, the space-dividing number conversion circuit 124 matches the intervals between a signal SA3 of the array interval $P_{PDA}$ output from the A/D conversion circuit 122 and the design value of the ABS pattern based on the pseudorandom code, in order to clearly distinguish the correlation, when an arithmetic operation for correlation is carried out between both data in a correlation circuit 126. In detail, based on a thought similar to the greatest common divisor of an integral number in elementary mathematics, the maximum real number value D that satisfies the expressions (1) and (2) at the same time is obtained as the interval D.

$$P_{PDA}=D*k1 \text{ (} k1 \text{ is an integral number greater than 1)} \quad (1)$$

$$P_{ABS}=D*k2 \text{ (} K2 \text{ is an integral number)} \quad (2)$$

That is, since k1 is greater than 1, the interval D is made finer than the array interval $P_{PDA}$.

As a detailed example, when the minimum line width $P_{ABS}$ of the ABS pattern 104 is 50 μm, and the array interval $P_{PDA}$ of the ABS light-receiving element array 114 is 3.5 μm, the interval D becomes 0.5 μm.

Also, although not corresponding to the present invention, where k1=1, since the array interval $P_{PDA}$ is made equal to the interval D, the expression (2) may be expressed by the expression (3) below.

$$P_{ABS}=P_{PDA}+K2 \text{ (} k2 \text{ is an integral number)} \quad (3)$$

That is, when the minimum line width $P_{ABS}$ becomes an integral multiple of the array interval $P_{PDA}$, the expressions (1) and (2) may be used. Therefore, even when the minimum line width $P_{ABS}$ becomes an integral multiple of the array interval $P_{PDA}$, no disadvantage is brought about if the space-dividing number conversion circuit 124 is used.

If the interval D is obtained by the expressions (1) and (2), the space-dividing number conversion circuit 124 newly obtains a digital value for each of the intervals D from the digital value (Signal SA3) subjected to output of the ABS light-receiving element array 114. In its most simplistic form, for example, digital values $F(P_{PDA}*x+D*i)$ for each of the intervals D can be obtained by linearly interpolating two digital values (Signal SA3) adjacent to each other. At this time, the following expression (4) may be used.

$$F(P_{PDA}*x+D*i)=F(P_{PDA}*x)+(F(P_{PDA}*(x+1))-(F(P_{PDA}*x))/k1*i \quad (4)$$

Here, i is an integral number (0<i<k1), $F(P_{PDA}*x)$ and $F(P_{PDA}*(x+1))$ respectively show digital values obtained at the xth time and at the (x+1)th time of the array interval $P_{PDA}$. Also, a digital value F for each of the intervals D may be obtained by partially approximating by a high-order function. For example, by applying a three-order polynomial expression to digital values (Signal SA3) at four points adjacent to each other, the interval between the second point and the third point, which becomes just the middle, is interpolated, whereby the digital value F for each of the intervals D may be obtained.

The digital value F of the interval D thus obtained is output as a signal SA4.

As shown in FIG. 1, the correlation circuit 126 processes the signal SA4 output from the space-dividing number conversion circuit 124. In detail, an arithmetic operation for correlation is carried out between the digitalized signal SA4 (the digital value subjected to output of the space-dividing number conversion circuit 124) of the interval D and the design value of the pseudorandom code used to form the ABS pattern 104, and calculates the absolute position of the scale 102 with respect to the light-receiving element 112 and outputs the ABS position signal SA9.

The noise filter/amplification circuit 140 processes a four-phase sinusoidal wave signal with a phase difference of 90°, which is an INC bright and dark signal SI1, as shown in FIG. 1. In detail, the noise filter/amplification circuit 140 cuts off high frequency noise by its low pass filter with respect to the INC bright and dark signal SI1, carries out amplification at a predetermined gain, and outputs a signal SI2.

The INC position detection circuit 142 processes the signal SI2 output from the noise filter/amplification circuit 140 as shown in FIG. 1. In detail, the INC position detection circuit 142 generates a two-phase sinusoidal wave signal with a phase difference of 90° from the four-phase sinusoidal wave signal with a phase difference of 90°, carries out an arc tangent operation, obtains the relative position and outputs the result as a signal SI3.

The absolute position output circuit 144 selects, as shown in FIG. 1, which of the signal SI3 output from the INC position detection circuit 142 or the ABS position signal SA9 output from the correlation circuit 126 is output as a position data signal Sout. In the present embodiment, for example, usually the signal SI3 is selected, and the ABS position signal SA9 is output as the position data signal Sout if there is a difference in the positions obtained from two signals by referencing the signal SI3 to the ABS position signal SA9 once every predetermined interval of time (which is appropriately set by the use conditions). Along therewith, the position data signal Sout is fed back to the INC position detection circuit 142 and is set as the current value inside the INC position detection circuit 142. In addition, the feedback is carried out when data are not renewed by a data refreshing rate in the correlation circuit 126.

Thus, even where the minimum line width $P_{ABS}$ of the ABS pattern 104 is not an integral multiple of the array interval $P_{PDA}$ of the light-receiving element array 114, the interval D, which is finer than the array interval $P_{PDA}$, may be made into the minimum resolution power. Therefore, since it is possible to obtain the absolute position at least further finer than the resolution power of the array interval $P_{PDA}$, the moving distance can be measured without lowering the accuracy. Accordingly, the degree of freedom in design of the minimum line width $P_{ABS}$ of the ABS pattern 104 and the range of selection of the light-receiving element 112 can be widened, wherein it becomes possible to compose an absolute position length measurement type encoder 100 having a higher degree of freedom with respect to the size, performance, and production costs thereof.

Also, the absolute position is obtained by carrying out an arithmetic operation for correlation in the correlation circuit 126. That is, since the absolute position is obtained with the highest correlation value, it is possible to correctly measure the moving distance even if there is some margin for error in output of the ABS light-receiving element array 114. That is, even if the scale 102 is subjected to damage and/or foreign substances and the bright and dark patterns based on the ABS pattern 104 are thereby influenced, it is possible to compose a robust absolute position length measurement type encoder 100 capable of securing the measurement accuracy.

In particular, in the present embodiment, since the interval D is the maximum real number value that satisfies the expressions (1) and (2), it becomes possible to quickly measure the moving distance at a further higher accuracy without increasing the arithmetic operation amount more than necessary.

Figure 5:
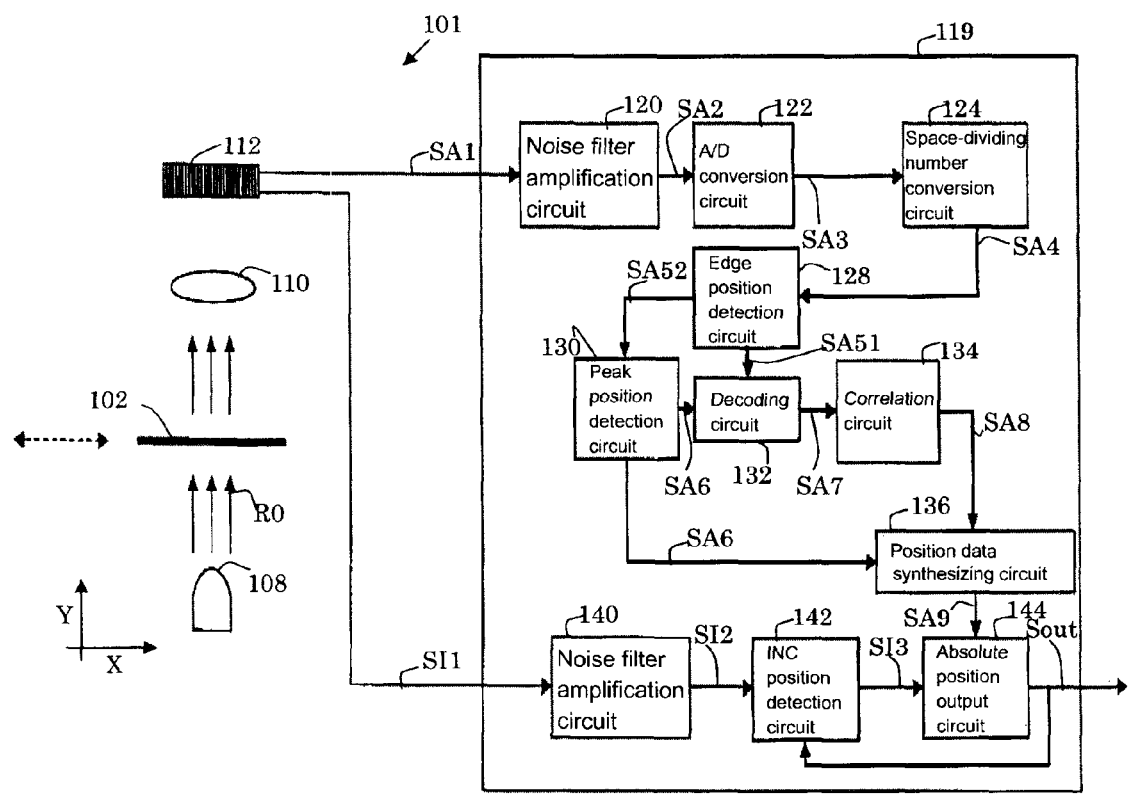
FIG. 5 is a schematic view showing the entirety of an absolute position length measurement type encoder according to Embodiment 2 of the present invention.
Figure 6:
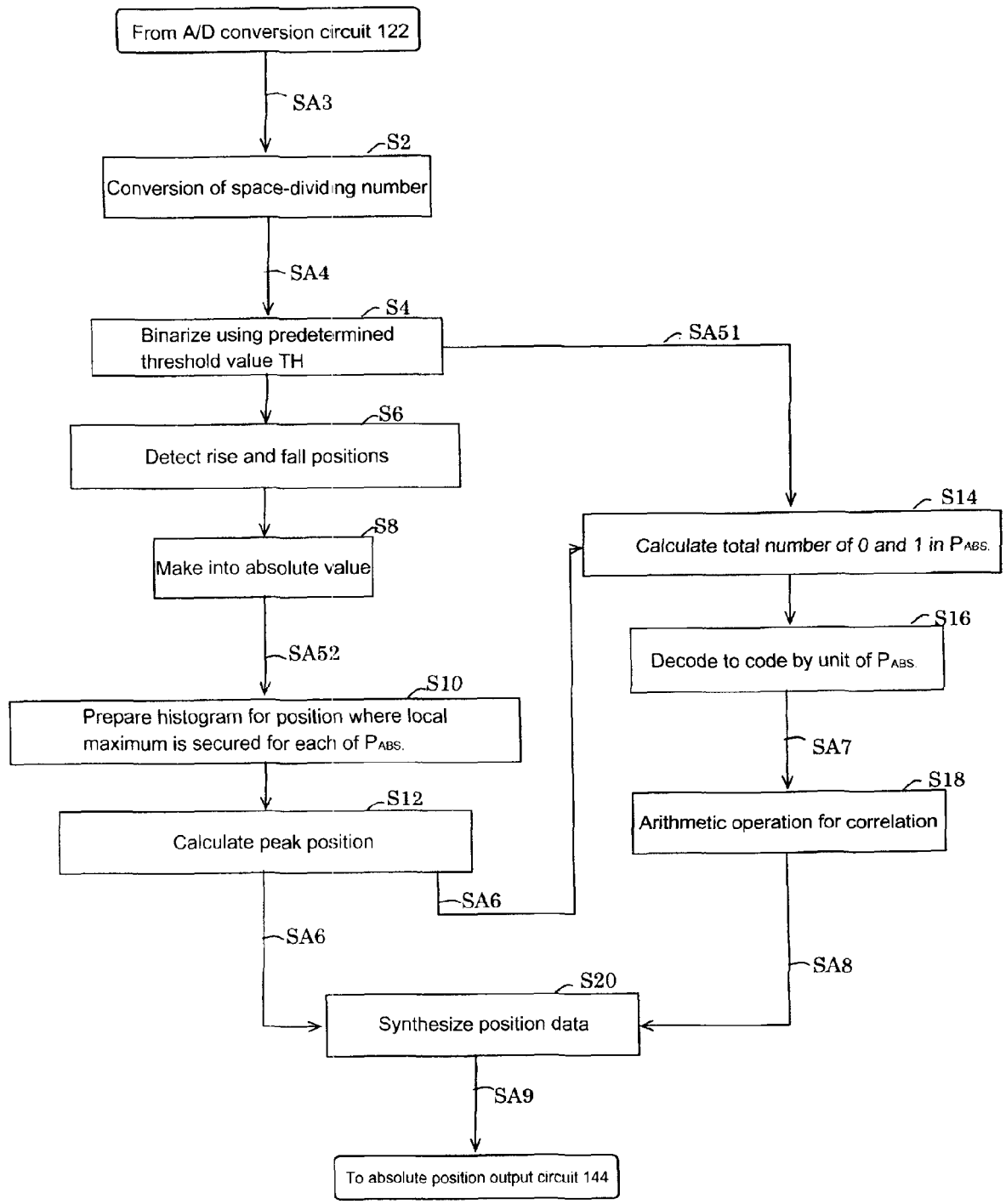
FIG. 6 is a flowchart showing actions from a space-dividing number conversion circuit to a position data synthesizing circuit according thereto.
Figure 7:
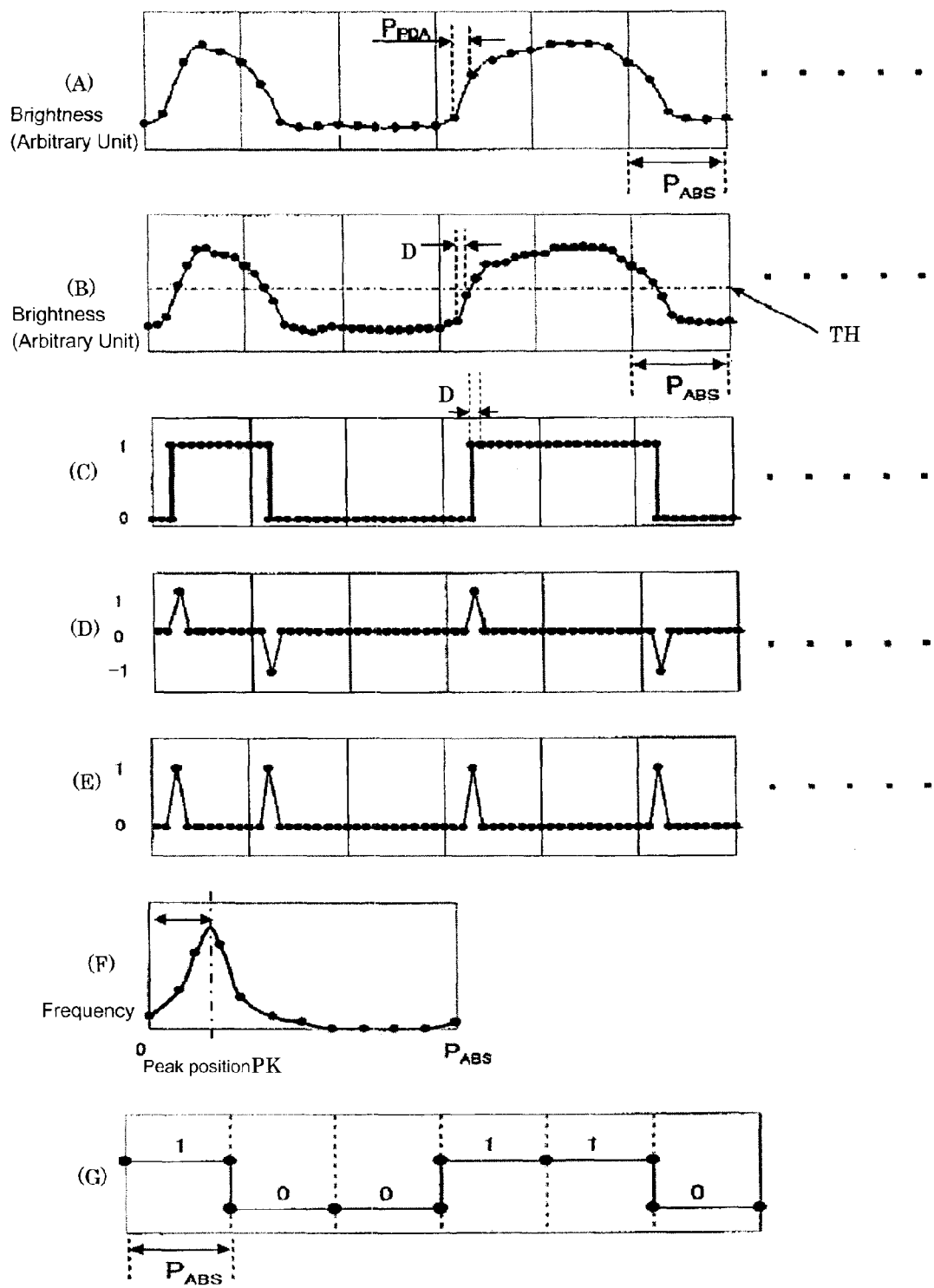
FIG. 7 is a schematic view showing signals corresponding to respective steps of FIG. 6 according thereto.

Next, a description is given of Embodiment 2 according to the present invention with reference to FIG. 5 through FIG. 7.

FIG. 5 is a schematic view showing the entirety of an absolute position length measurement type encoder according to Embodiment 2, FIG. 6 is a flowchart showing actions from a space-dividing number conversion circuit to a position data synthesizing circuit, and FIG. 7 is a schematic view showing signals corresponding to respective steps of FIG. 6.

As shown in FIG. 5, the absolute position length measurement type encoder 101 has a configuration similar to the absolute position length measurement type encoder 100 as the entirety according to Embodiment 1. However, the encoder 101 differs from the encoder 100 in that the signal processing circuit 119 includes an edge position detection circuit 128, a peak position detection circuit 130, and a decoding circuit 132 in the front stage of a correlation circuit 134, and includes a position data synthesizing circuit 136 in the back stage of the correlation circuit 134.

Therefore, in FIG. 5 that shows Embodiment 2, the same reference numerals are given to the same components as those of Embodiment 1 shown in FIG. 1. A description thereof is omitted, and the description of Embodiment 1 is quoted. In the present embodiment, a detailed description is given of the edge position detection circuit 128, the peak position detection circuit 130, the decoding circuit 132, the correlation circuit 134 and the position data synthesizing circuit 136.

As shown in FIG. 5, the edge position detection circuit 128 first binarizes a signal SA4 output from the space-dividing number conversion circuit 124, and when carrying out binarization, it is necessary to provide a predetermined threshold value TH. For example, in the present embodiment, the middle value between the minimum value and the maximum value of signal SA4 may be used as the predetermined threshold value TH. Another predetermined threshold value TH may be obtained based on a histogram or a threshold value TH may be obtained for each of the zones with the zones classified. And, the binarized value is output as signal SA51. The binarized value is made into an absolute value after being differentiated. The value is output as signal SA52.

As shown in FIG. 5, the peak position detection circuit 130 prepares a histogram in regard to the position that becomes a local maximum value (the maximum value in the minimum line width $P_{ABS}$) of a value obtained from signal SA52 for each of the minimum line width $P_{ABS}$ of the ABS pattern 104, and obtains the peak position PK from the histogram. The obtained value is output as signal SA6.

The decoding circuit 132 carries out processing based on a binarized value of the signal SA51 as the peak position PK of the signal SA6 as the position (reference position) where the pseudorandom code to be decoded is changed over as shown in FIG. 5. In detail, the decoding circuit 132 decodes the code to the pseudorandom code of 0 or 1 by the unit of the minimum line width $P_{ABS}$ of the ABS pattern 104 from the position shifted only by the peak position PK. The decoded code is output as the ABS decoding signal SA7.

As shown in FIG. 5, the correlation circuit 134 processes the ABS decoding signal SA7 output from the decoding circuit 132. In detail, the correlation circuit 134 carries out an arithmetic operation for correlation between the ABS decoding signal SA7 (a digital value subjected to output of the space-dividing number conversion circuit 124) being a binary value by the unit of the input maximum line width $P_{ABS}$ and a design value of the pseudorandom code used to form the ABS pattern 104. And, the correlation circuit 134 calculates the absolute position of the scale 102 with respect to the light-receiving element 112 and outputs a before-ABS-correction position signal SA8.

As shown in FIG. 5, the position data synthesizing circuit 136 obtains an accurate absolute position by shifting the before-ABS-correction position signal SA8 output from the ABS position detection circuit (position detection circuit) 130 only by the peak position PK at the peak position signal SA6 obtained in the peak position detection circuit 130 the and correcting the same. The obtained absolute position is output as the ABS synthesization position signal SA9.

Next, referring to FIG. 7, a description is given of a signal processing flow from the space-dividing number conversion circuit 124 to the position data synthesizing circuit 136 based on FIG. 6.

First, when the signal SA3 (Refer to FIG. 7(A)) digitalized by the A/D conversion circuit 122 is input into the space-dividing number conversion circuit 124, the maximum real number value D is obtained, which satisfies the expressions (1) and (2) with respect to the minimum line width $P_{ABS}$ of the ABS pattern 104 and the array interval $P_{PDA}$ of the ABS light-receiving element array 114. And, the signal SA4 being a digital value for each of the intervals D is obtained based on, for example, the expression (4), and a space-dividing number conversion is carried out (Step 2). As a result, the signal is output as the signal SA4 in a pattern of FIG. 7(B). As shown in FIG. 7(B), the signal SA4 becomes a digital value sampled at a newly obtained interval D.

Next, the signal SA4 output from the space-dividing number conversion circuit 124 is binarized using a predetermined threshold value TH in the edge position detection circuit 128 (Step S4). And, a binarized and output signal SA51 is brought into a pattern shown in FIG. 7(C).

Next, the binarized value is differentiated in the same edge position detection circuit 128, wherein a rise position and a fall position are detected (Step S6). The signal at this time is brought into a pattern shown in FIG. 7(D).

Next, the obtained differential signal is made into an absolute value in the same edge position detection circuit 128 (Step S8). The signal at this time is brought into a pattern shown in FIG. 7(E). The value at this time is the signal SA52.

Next, with respect to positions where the value made into an absolute value per minimum line width $P_{ABS}$ of the ABS pattern 104 is locally maximized (the maximum value by the unit of the minimum line width $P_{ABS}$), a histogram is prepared at a zone of the minimum line width $P_{ABS}$ of the ABS pattern 104 in the peak position detection circuit 126 (Step S10).

Next, the peak position PK for frequency in the histogram is calculated in the same peak position detection circuit 130 (Step S12). FIG. 7(F) shows a histogram with respect to the positions where the value is locally maximized in a zone of the minimum line width $P_{ABS}$ of the ABS pattern 104. In the drawing, the position where the frequency is maximized is the peak position PK. In the present embodiment, by fitting a probability distribution function (for example, Gaussian distribution function) by the least-squares method, respective values of the histogram are interpolated, and the peak position PK is obtained. Also, other probability distribution functions may be adopted, or fitting of not only the probability distribution function but also interpolation between adjacent two points and multiple-order functions may be carried out. Further, a position of high frequency may be simply used as the peak position PK as it is. The obtained peak position PK is output to the decoding circuit 132 and the position data synthesizing circuit 136 as the peak position signal SA6.

Next, in the decoding circuit 132, the numbers of 1 and 0 are added up in the minimum line width $P_{ABS}$ of the respective ABS pattern 104 for every zone of the minimum line width $P_{ABS}$ from the position where shifted only by the peak position PK of the peak position signal SA6, and the total numbers thereof are obtained (Step S14).

Next, with respect to the added-up result, the same decoding circuit 132 compares whether the total number of 1 is greater or the total number of 0 is greater by the unit of the minimum line width $P_{ABS}$ of the ABS pattern 104, and determines the code based on the value of the total number of which is greater. Based on the determined code, the code is decoded (Step S16). The ABS decoding signal SA7 output decoded and output from the decoding circuit 132 is brought into a pattern shown in FIG. 7(G).

Next, the correlation circuit 134 carries out an arithmetic operation for correlation between the decoded pseudorandom code of the ABS decoding signal SA7 and the design value of the pseudorandom code, and obtains the absolute position of the scale 102 with respect to the light-receiving element 112 (Step S18). The value is output as the before-ABS-correction position signal SA8.

Next, position data are synthesized by adding the peak position PK of the peak position signal SA6 to the absolute position of the before-ABS-correction position signal SA8 in the position data synthesizing circuit 136 (Step S20). The synthesized value is output to the absolute position output circuit 144 as the ABS position data signal SA9.

Thus, in the present embodiment, in addition to the effects obtained in Embodiment 1, the arithmetic operation for correlation is not executed based on the bit number of the A/D converted digital value but is executed by the correlation circuit 134 after binarization and decoding to a code. That is, the digital value subjected to output of the space-dividing number conversion circuit 124 is a value binarized by the unit of the minimum line width $P_{ABS}$ of the ABS pattern 104, and an arithmetic operation for correlation is carried out with the value and the pseudorandom code of the design value, wherein the arithmetic operation amount can be remarkably decreased. For example, if it is assumed that the arithmetic operation for correlation has conventionally been carried out using a 4-bit digital value by the unit of the array internal $P_{PDA}$ of the ABS light-receiving element array 114, in the present embodiment, it is possible to carry out the arithmetic operation for correlation at a remarkably small amount of data, which is based on only 1-bit, by the unit of the minimum line width $P_{ABS}$ of the ABS pattern 104. That is, even if the absolute position is frequently measured using the ABS pattern 104, stabilized measurement having favorable slaved tracking is enabled for the moving distance.

Simultaneously, the decoding is carried out by the unit of the minimum line width $P_{ABS}$ of the ABS pattern 104, which is the same as the minimum unit of the pseudorandom code of the design value. Therefore, since the lengths of mutual codes are matched with each other when the arithmetic operation for correlation is carried out, it is possible to remarkably clearly determine whether or not there is any correlation. And, since the absolute position is corrected by the peak position PK, highly accurate measurement of the absolute position is enabled.

That is, in the present embodiment, the absolute position can be calculated at high accuracy with a small arithmetic operation amount even if the pseudorandom code is used for the ABS pattern 104. Therefore, the absolute position can be frequently calculated from the ABS pattern 104, wherein, for example, if the scale 102 quickly moves greatly, measurement of the moving distance of the scale with respect to the light-receiving element 112 can be carried out with a good slaved tracking performance and the accuracy kept.

The present invention has been described based on Embodiments 1 and 2 described above. However, the present invention is not limited to the above-described embodiments. That is, it is a matter of course that the present invent ion may be subjected to various modifications and variations in design within the scope not departing from the gist of the present invention.

Figure 8:
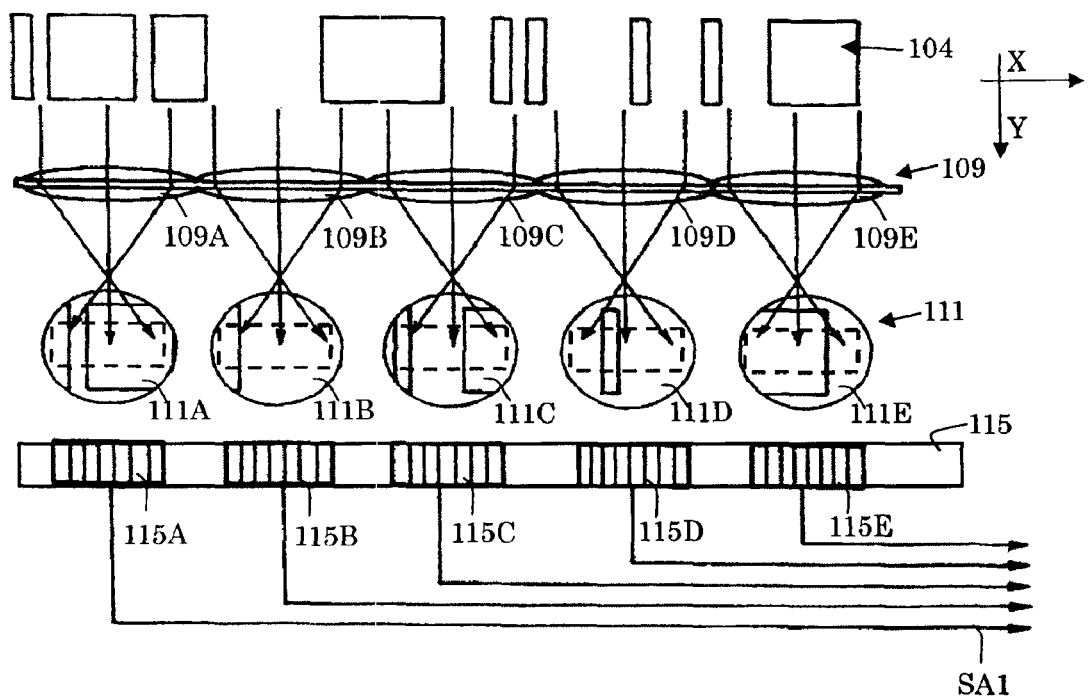
FIG. 8 is a schematic view exemplarily showing the relationship between an ABS pattern, a lens array and a light-receiving element according to Embodiment 3 of the present invention.

In the above-described embodiments, it was configured that bright and dark patterns are imaged all in the X-axis direction of the ABS light-receiving element array 114 by a single lens 110. However, the present invention is not limited thereto. For example, as in Embodiment 3 shown in FIG. 8, it may be possible that a lens array in which a plurality of minor lenses 109A through 109E are juxtaposed in the lens 109 is used. In this case, since images 111 of bright and dark patterns are left-right reversed on the ABS light-receiving element array 115, it is necessary that the reading direction of image data is reversed to the moving direction for each of the minor array 115A through 115E of the ABS light-receiving element array 115. However, since the ABS pattern 104 and the ABS light-receiving element array 115 may be disposed in proximity to each other, the absolute position length measurement type encoder itself can be thinned, and can be made durable against disturbance.

Also, in the above-described embodiments, although the absolute position was obtained by carrying out an arithmetic operation for correlation using the correlation circuits 126 and 134, the present invention is not limited thereto. For example, a circuit for obtaining an absolute position by referencing a table may be provided instead of the correlation circuits 126 and 134. Describing the detailed functions thereof, for example, the digital values subjected to output of the space-dividing number conversion circuit are regarded as address signals, and reference is made to memories shown by the respective address signals. At this time, absolute positions corresponding to the respective address signals are stored in the respective memories in advance, whereby it becomes possible to obtain the absolute positions from the address signals. In this case, although it is difficult to obtain accurate absolute positions if an error occurs in the address signals, it is possible to obtain absolute positions at a high speed since no complicated arithmetic operations are carried out.

Figure 9:
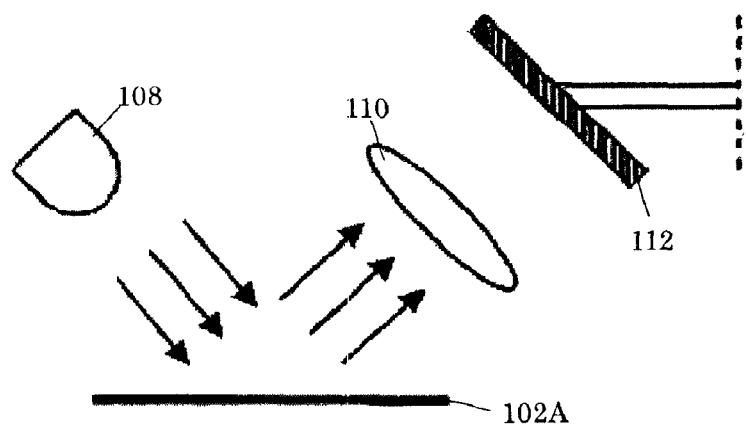
FIG. 9 is a schematic view exemplarily showing the relationship between a light-emitting element, a scale and a light-receiving element according to Embodiment 4 of the present invention.

Further, although, in the embodiments described above, the bright and dark patterns formed by the scale 102 are formed by transmission light of the scale 102, for example, the present invention is not limited thereto. For example, as in Embodiment 4 shown in FIG. 9, such a configuration may be adopted, in which bright and dark patterns are formed by the projection light R0 to the scale 102A being reflected, and are imaged on the light-receiving element 112.

Also, for example, in the embodiment described above, in order to decode the pseudorandom code from the binarized values, decoding is carried out in such a manner that the total numbers of 1 and 0 are obtained at a cycle of the minimum line width $P_{ABS}$, comparison is carried out with respect to whether the total number of 1 is greater or the total number of 0 is greater, and the code is determined by the value the total number of which is greater. However, the present invention is not limited thereto. For example, the code of the minimum line width $P_{ABS}$ may be determined and decoded by determining that the value at a specified position (for example, the center) of the cycle of the minimum line width $P_{ABS}$ is 1 or 0.

In addition, in the above-described embodiments, although the interval D is the maximum real number value D that satisfies the expressions (1) and (2), the present invention is not limited thereto. It is sufficient that the interval D is smaller than the array internal $P_{PDA}$. If so, since the correlation can be obtained by the resolution power of the interval D when carrying out an arithmetic operation for correlation, the absolute positions can be measured further minutely than the array interval $P_{PDA}$, and the total amount of calculation can be further decreased, wherein the absolute positions can be measured at a further higher speed.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. An absolute position length measurement encoder comprising:
   a scale in which an absolute (ABS) pattern based on a pseudorandom code is provided;
   a light-receiving element for receiving bright and dark patterns formed by the scale, the light receiving element including an ABS light-receiving element array having an array interval $P_{PDA}$; and
   a signal processing circuit for processing signals sublected to output of the light-receiving element and measuring an absolute position of the scale to the light-receiving element;
   wherein the signal processing circuit includes a space-dividing number conversion circuit that obtains a smaller interval D than the array interval $P_{PDA}$ of the ABS light-receiving element array of the light-receiving element, and simultaneously obtains and outputs a digital value for each interval D sublected to output of the ABS light-receiving element array;

wherein the signal processing circuit further includes a correlation circuit for executing arithmetic operations for correlation between the digital value subjected to output of the space-dividing number conversion circuit and a design value of the pseudorandom code;

wherein a digital value subjected to arithmetic operations for correlation by the correlation circuit is made into a value binarized by a unit of a minimum line width $P_{ABS}$ of the ABS pattern; and wherein the signal processing circuit comprising;

in an input side of the correlation circuit,
- an edge position detection circuit for first binarizing a signal output from the space-dividing number conversion circuit;
- a peak position detection circuit for preparing a histogram with respect to a position where a value obtained from a signal differentiated and made into an absolute value after being binarized becomes a local maximum value, for each of the minimum line width $P_{ABS}$ of the ABS pattern and for obtaining a peak position PK from the histogram; and
- a decoding circuit for processing the peak position PK based on the binarized value of a signal as the position where the pseudorandom code to be decoded is changed over; and in an output side of the correlation circuit, a position data synthesizing circuit for obtaining an accurate absolute position, with respect to a before-ABS-correction position signal output from the correlation circuit, through position correction by shifting the absolute position only by the peak position PK by means of a peak position signal obtained by the peak position detection circuit.

2. The absolute position length measurement encoder according to claim 1, wherein the peak position detection circuit obtains the peak position PK by interpolating respective values of the histogram by fitting a probability distribution function by the least-squares method.

3. The absolute position length measurement encoder according to claim 1, wherein the decoding circuit obtains respective total number of the binarized values in the minimum line width $P_{ABS}$, determines and decodes the code of the minimum line width $P_{ABS}$ with a value having a greater total number.

4. The absolute position length measurement encoder according to claim 1, wherein the correlation circuit carries out arithmetic operations for correlation between the decoded pseudorandom code and the design value of the pseudorandom code, and obtains the absolute position of the scale with respect to the light-receiving element.

5. The absolute position length measurement encoder according to claim 1, wherein the position data synthesizing circuit synthesizes position data by adding the peak position PK of the peak position signal to the absolute position of the absolute position signal.

* * * * *